US012381657B2

(12) United States Patent
Dimou et al.

(10) Patent No.: US 12,381,657 B2
(45) Date of Patent: Aug. 5, 2025

(54) CONFIGURATION BASED HYBRID AUTOMATIC REPEAT REQUEST TRIGGER

(71) Applicant: QUALCOMM Incorporated, San Diego, CA (US)

(72) Inventors: Konstantinos Dimou, New York City, NY (US); Ahmed Elshafie, San Diego, CA (US); Wei Yang, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/823,865

(22) Filed: Aug. 31, 2022

(65) Prior Publication Data

US 2023/0060710 A1 Mar. 2, 2023

Related U.S. Application Data

(60) Provisional application No. 63/260,819, filed on Sep. 1, 2021.

(51) Int. Cl.
*H04W 72/232* (2023.01)
*H04L 1/1812* (2023.01)
(Continued)

(52) U.S. Cl.
CPC .......... *H04L 1/1812* (2013.01); *H04W 72/23* (2023.01); *H04W 72/232* (2023.01); *H04W 72/569* (2023.01)

(58) Field of Classification Search
CPC ... H04L 1/1812; H04L 1/1685; H04L 1/1861; H04L 1/1864; H04L 1/1854; H04W 72/23; H04W 72/569; H04W 72/232
See application file for complete search history.

(56) References Cited

U.S. PATENT DOCUMENTS 9,374,809 B2 * 6/2016 Dai ...................... H04L 1/1861
2021/0242977 A1 8/2021 Khoshnevisan et al.
(Continued)

FOREIGN PATENT DOCUMENTS

WO WO-2020145704 A1 7/2020

OTHER PUBLICATIONS

3GPP TS 38.213: "3rd Generation Partnership Project, Technical Specification Group Radio Access Network, NR, Physical Layer Procedures for Control (Release 16)", 3rd Generation Partnership Project, Mobile Competence Centre, 650, Route Des Lucioles, F-06921 Sophia-Antipolis Cedex, France, vol. RAN WG1. No. V16.1.0, Apr. 3, 2020, XP051893821, pp. 1-156, p. 17, line 3—p. 18, line 8, paragraph [0010], Section 9, clauses 6, 9.2.1, 10.2 and 12, chapter 11.1 on p. 114-116.
(Continued)

*Primary Examiner* — Salvador E Rivas
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive signaling indicating one or more selected priorities, of at least two priorities, to which a trigger for hybrid automatic repeat request (HARQ) feedback applies. The UE may receive downlink control information (DCI) including the trigger for the HARQ feedback and omitting a field indicating the one or more selected priorities. The UE may transmit the HARQ feedback for the one or more selected priorities in accordance with the signaling. Numerous other aspects are described.

30 Claims, 8 Drawing Sheets

(51) Int. Cl.
  *H04W 72/23*    (2023.01)
  *H04W 72/566*   (2023.01)

(56) References Cited

U.S. PATENT DOCUMENTS

| | | | | |
|---|---|---|---|---|
| 2022/0385411 A1* | 12/2022 | Lei | ............... | H04L 1/1614 |
| 2023/0035066 A1* | 2/2023 | Bae | ............... | H04W 72/1268 |
| 2023/0163885 A1* | 5/2023 | Zhang | ............... | H04L 1/1685 |
| | | | | 370/329 |
| 2023/0163922 A1* | 5/2023 | Zhang | ............... | H04L 1/1812 |
| | | | | 370/329 |
| 2024/0313919 A1* | 9/2024 | Kim | ............... | H04B 7/0478 |

OTHER PUBLICATIONS

International Search Report and Written Opinion—PCT/US2022/075848—ISA/EPO—Nov. 30, 2022.
Nokia, et al., "Remaining Issues on NR-U HARQ Scheduling and Feedback," R1-2000503, 3GPP TSG RAN WG1 Meeting #100e, Feb. 24-28, 2020, (Feb. 28, 2020), 12 pages, the whole document.

* cited by examiner

CONFIGURATION BASED HYBRID AUTOMATIC REPEAT REQUEST TRIGGER

CROSS-REFERENCE TO RELATED APPLICATION

This patent application claims priority to U.S. Provisional Patent Application No. 63/260,819, filed on Sep. 1, 2021, entitled "CONFIGURATION BASED HYBRID AUTOMATIC REPEAT REQUEST TRIGGER," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a configuration based hybrid automatic repeat request (HARD) trigger.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving signaling indicating one or more selected priorities, of at least two priorities, to which a trigger for hybrid automatic repeat request (HARQ) feedback applies. The method may include receiving downlink control information (DCI) including the trigger for the HARQ feedback and omitting a field indicating the one or more selected priorities. The method may include transmitting the HARQ feedback for the one or more selected priorities in accordance with the signaling.

Some aspects described herein relate to a method of wireless communication performed by a base station. The method may include transmitting signaling indicating one or more selected priorities, of at least two priorities, to which a trigger for HARQ feedback applies. The method may include transmitting DCI including the trigger for the HARQ feedback and omitting a field indicating the one or more selected priorities. The method may include receiving the HARQ feedback for the one or more selected priorities in accordance with the signaling.

Some aspects described herein relate to a UE for wireless communication. The user equipment may include a memory and one or more processors coupled to the memory. The one or more processors may be configured to receive signaling indicating one or more selected priorities, of at least two priorities, to which a trigger for HARQ feedback applies. The one or more processors may be configured to receive DCI including the trigger for the HARQ feedback and omitting a field indicating the one or more selected priorities. The one or more processors may be configured to transmit the HARQ feedback for the one or more selected priorities in accordance with the signaling.

Some aspects described herein relate to a base station for wireless communication. The base station may include a memory and one or more processors coupled to the memory. The one or more processors may be configured to transmit signaling indicating one or more selected priorities, of at least two priorities, to which a trigger for HARQ feedback applies. The one or more processors may be configured to transmit DCI including the trigger for the HARQ feedback and omitting a field indicating the one or more selected priorities. The one or more processors may be configured to receive the HARQ feedback for the one or more selected priorities in accordance with the signaling.

Some aspects described herein relate to a non-transitory computer-readable medium that stores a set of instructions for wireless communication by a UE. The set of instructions, when executed by one or more processors of the UE, may cause the UE to receive signaling indicating one or more selected priorities, of at least two priorities, to which a trigger for HARQ feedback applies. The set of instructions, when executed by one or more processors of the UE, may cause the UE to receive DCI including the trigger for the HARQ feedback and omitting a field indicating the one or more selected priorities. The set of instructions, when executed by one or more processors of the UE, may cause the UE to transmit the HARQ feedback for the one or more selected priorities in accordance with the signaling.

Some aspects described herein relate to a non-transitory computer-readable medium that stores a set of instructions for wireless communication by a base station. The set of instructions, when executed by one or more processors of the base station, may cause the base station to transmit signaling indicating one or more selected priorities, of at least two priorities, to which a trigger for HARQ feedback applies. The set of instructions, when executed by one or more processors of the base station, may cause the base station to transmit DCI including the trigger for the HARQ feedback and omitting a field indicating the one or more selected priorities. The set of instructions, when executed by one or more processors of the base station, may cause the base station to receive the HARQ feedback for the one or more selected priorities in accordance with the signaling.

Some aspects described herein relate to an apparatus for wireless communication. The apparatus may include means for receiving signaling indicating one or more selected priorities, of at least two priorities, to which a trigger for HARQ feedback applies. The apparatus may include means for receiving DCI including the trigger for the HARQ feedback and omitting a field indicating the one or more selected priorities. The apparatus may include means for transmitting the HARQ feedback for the one or more selected priorities in accordance with the signaling.

Some aspects described herein relate to an apparatus for wireless communication. The apparatus may include means for transmitting signaling indicating one or more selected priorities, of at least two priorities, to which a trigger for HARQ feedback applies. The apparatus may include means for transmitting DCI including the trigger for the HARQ feedback and omitting a field indicating the one or more selected priorities. The apparatus may include means for receiving the HARQ feedback for the one or more selected priorities in accordance with the signaling.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
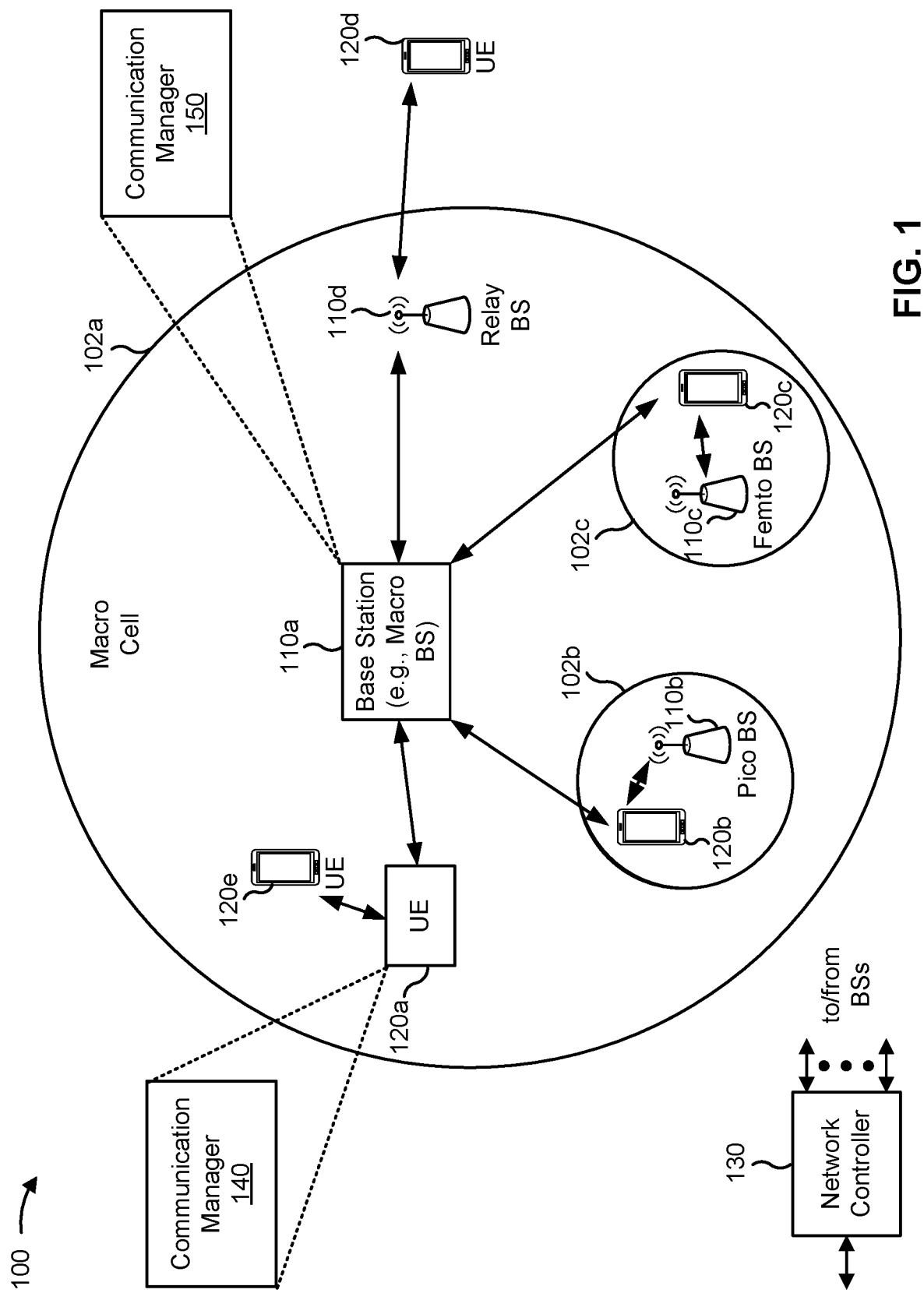
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive signaling indicating one or more selected priorities, of at least two priorities, to which a trigger for hybrid automatic repeat request (HARQ) feedback applies; receive downlink control information (DCI) including the trigger for the HARQ feedback and omitting a field indicating the one or more selected priorities; and transmit the HARQ feedback for the one or more selected priorities in accordance with the signaling. Additionally, or alternatively, the communication manager 140 may perform one or more other operations described herein.

In some aspects, the base station 110 may include a communication manager 150. As described in more detail elsewhere herein, the communication manager 150 may transmit signaling indicating one or more selected priorities, of at least two priorities, to which a trigger for HARQ feedback applies; transmit DCI including the trigger for the HARQ feedback and omitting a field indicating the one or more selected priorities; and receive the HARQ feedback for the one or more selected priorities in accordance with the signaling. Additionally, or alternatively, the communication manager 150 may perform one or more other operations described herein.

As indicated above, FIG. 1 is provided as an example. Other examples may differ from what is described with regard to FIG. 1.

Figure 2:
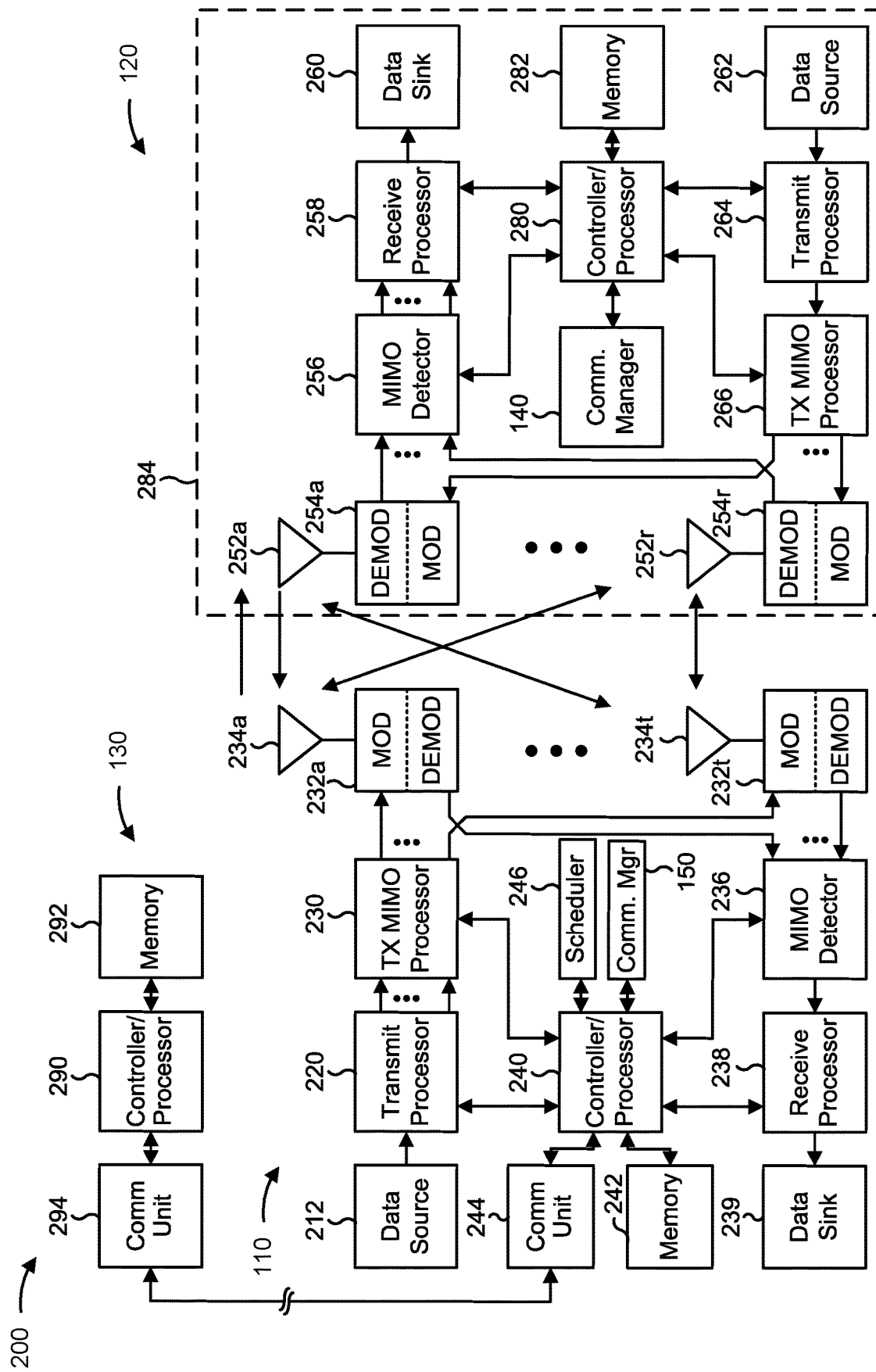
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with a configuration based HARQ trigger, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for receiving (e.g., using antenna 252, modem 254, MIMO detector 256, receive processor 258, controller/processor 280, and/or the like) signaling indicating one or more selected priorities, of at least two priorities, to which a trigger for HARQ feedback applies; means for receiving (e.g., using antenna 252, modem 254, MIMO detector 256, receive processor 258, controller/processor 280, and/or the like) DCI including the trigger for the HARQ feedback and omitting a field indicating the one or more selected priorities; and/or means for transmitting (e.g., using controller/processor 280, transmit processor 264, TX MIMO processor 266, modem 254, antenna 252, and/or the like) the HARQ feedback for the one or more selected priorities in accordance with the signaling. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting (e.g., using controller/processor 240, transmit processor 220, TX MIMO processor 230, MOD 232, antenna 234, and/or the like) signaling indicating one or more selected priorities, of at least two priorities, to which a trigger for HARQ feedback applies; means for transmitting (e.g., using controller/processor 240, transmit processor 220, TX MIMO processor 230, modem 232, antenna 234, and/or the like) DCI including the trigger for the HARQ feedback and omitting a field indicating the one or more selected priorities; and/or means for receiving (e.g., using controller/processor 240, modem 232, antenna 234, and/or the like) the HARQ feedback for the one or more selected priorities in accordance with the signaling. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as an NB, eNB, NR BS, 5G NB, gNB, AP, TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

HARQ feedback provides a way for a receiver to signal whether the receiver has successfully received information transmitted by a transmitter. A UE and a base station may maintain respective HARQ configurations, and the UE may selectively retransmit information based on results of HARQ procedures. A transmission or resource may be associated with a HARQ process (sometime referred to as a HARQ process identifier) that may be used to differentiate HARQ feedback associated with the transmission or resource from HARQ feedback associated with other transmissions or resources. HARQ feedback from a UE may be provided via uplink control information (UCI), which can be provided on a physical uplink control channel (PUCCH) or a physical uplink shared channel (PUSCH).

A UE or base station may be capable of requesting HARQ feedback for a specific set of transmissions or resources (such as a specific HARQ process or a set of HARQ processes). Furthermore, a UE or base station may be capable of requesting all HARQ feedback for multiple HARQ processes. Triggered HARQ feedback for a specific set of transmissions or resources, or for multiple HARQ processes, may be referred to as Type-3 HARQ-ACK feedback. Type-3 HARQ-ACK feedback may be triggered by DCI, such as DCI scheduling a physical downlink control channel (PDSCH) (e.g., DCI Format 1_1), though Type-3 HARQ-ACK feedback can also be triggered by DCI that does not schedule a PDSCH. HARQ-ACK feedback may be transmitted via a HARQ codebook. A HARQ codebook may include a plurality of positions, where each position corresponds to a HARQ process. In each position, a bit may indicate an acknowledgment (ACK) or a negative ACK (NACK) for a transmission or resource associated with the corresponding HARQ process.

Type-3 HARQ-ACK feedback may be useful, for example, in the situation when a base station receives neither an ACK nor a NACK for a downlink communication, when the base station is associated with poor coverage, or when the base station expects not to acquire sufficient channel access to receive individual HARQ feedback for multiple HARQ processes. In the case of a failed ACK/NACK transmission, the base station may not know whether the ACK/NACK was not received because a UE did not receive the downlink communication (such as a missed control channel indicating the presence of a transmission, etc.), or because the UE successfully received the downlink communication and failed to transmit the ACK/NACK. For example, the UE may fail to transmit the ACK/NACK based on failing to secure channel access using a listen-before-talk or listen-before-transmit (LBT) operation.

In some cases, HARQ feedback may be transmitted via a PUCCH. The PUCCH may be transmitted on one of multiple carriers. For example, a UE may have a primary component carrier (PCC) (e.g., primary cell) and one or more secondary component carriers (SCCs) (e.g., secondary cells). The PUCCH can be transmitted on an indicated one of these multiple carriers (where switching the carrier on which the PUCCH is transmitted is referred to herein as "PUCCH switching"). For example, a base station may indicate which CC is to carry the PUCCH in a slot, such as via a DCI field or a radio resource control (RRC) configured time pattern (e.g., semi-static indication). The DCI field may be used for indication of a carrier for HARQ feedback regarding a dynamically scheduled PDSCH, whereas the RRC configured time pattern may be used for indication of a carrier for HARQ feedback regarding a semi-persistent scheduling (SPS) PDSCH.

A UE may communicate using different priorities. For example, a communication (such as a logical channel associated with the communication) may be associated with a priority. The UE may handle prioritization of communications, such as selecting a communication to be transmitted in the case of overlapped communications, performing power control for respective communications, or the like, based at least in part on the priority. As one example, priorities may be used to implement different classes of traffic, such as ultra-reliable low-latency communication (URLLC) traffic and enhanced mobile broadband (eMBB) traffic.

Communications with a first priority and communications with a second priority may have respective HARQ processes. For example, the communications with the first priority may have HARQ processes selected from a pool of HARQ processes, and the communications with the second priority may also have HARQ processes selected from the same pool of HARQ processes. More specifically, a communication with the first priority can have the same HARQ process as a communication with the second priority. Thus, HARQ feedback (e.g., a HARQ codebook) may need to be associated with one of the first priority or the second priority, or there may be confusion as to whether the HARQ feedback applies to communications associated with the first priority or communications associated with the second priority. For example, in the case of Type-3 HARQ-ACK feedback, if there is ambiguity about whether the triggering DCI triggers HARQ feedback for the first priority or the second priority, then improper HARQ feedback reporting or an error may ensue, which reduces throughput and increases the occurrence of dropped communications. Furthermore, if PUCCH switching among carriers is enabled, there may be uncertainty as to which carrier will carry HARQ feedback for a group of carriers.

Some techniques and apparatuses described herein provide a configuration based technique for differentiating whether a Type-3 HARQ-ACK feedback trigger applies to communications of a first priority, communications of a second priority, or both. For example, a UE may receive signaling indicating whether DCI indicating to transmit one-shot HARQ feedback applies to a first priority, a second priority, or both. In some aspects, the signaling may be RRC signaling or medium access control (MAC) signaling. Thus, the DCI does not need to include a bitfield indicating one or more priorities to which the DCI applies, which reduces DCI overhead, increases throughput, and reduces the occurrence of dropped communications. In some aspects, the signaling (or other signaling) may indicate one or more carriers on which the one-shot HARQ feedback is to be transmitted, thereby eliminating ambiguity regarding which carrier should carry the one-shot HARQ feedback, which increases throughput and improves utilization of resources.

Figure 3:
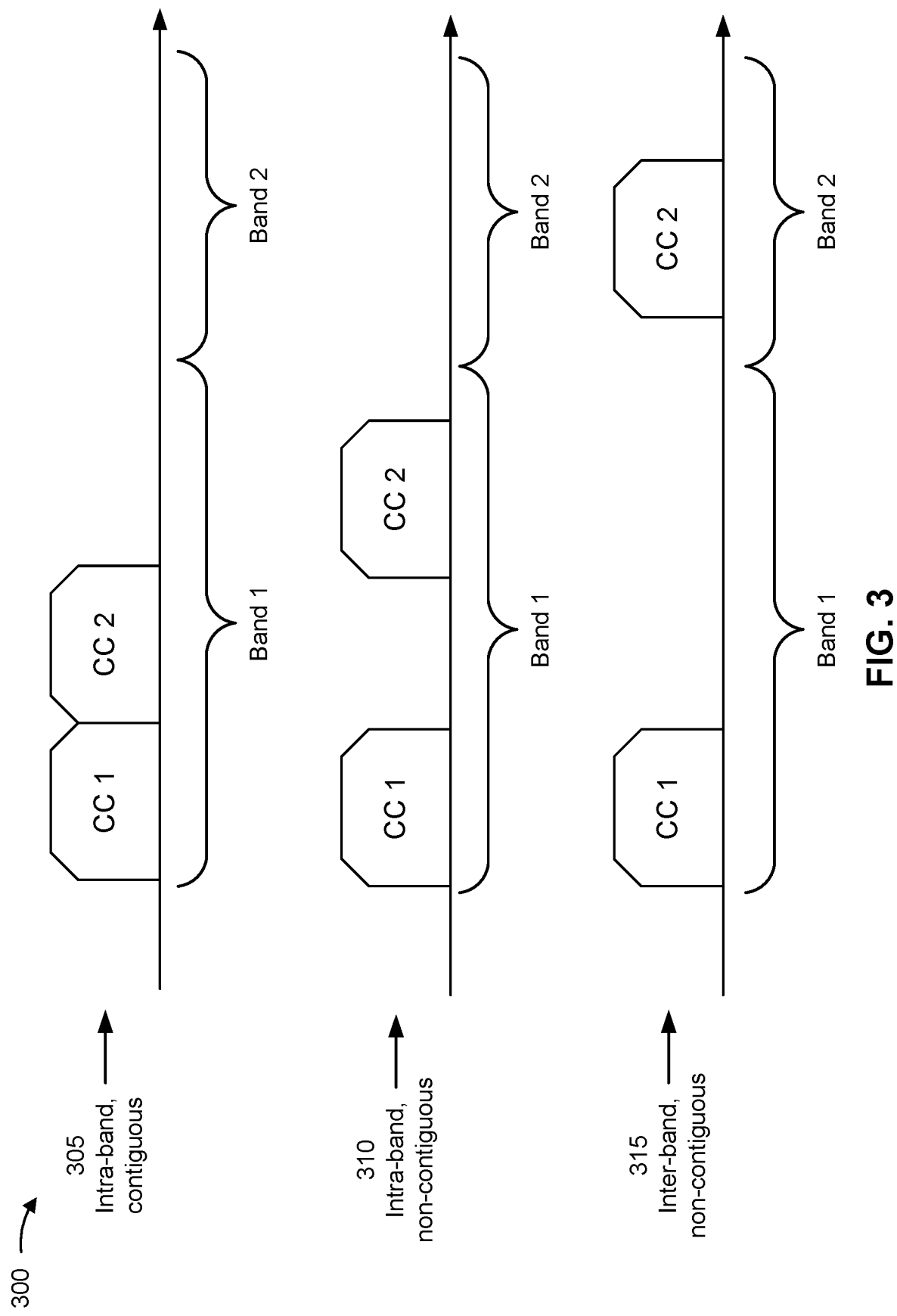
FIG. 3 is a diagram illustrating examples of carrier aggregation, in accordance with the present disclosure.

FIG. 3 is a diagram illustrating examples 300 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in an RRC message, DCI, and/or another signaling message.

As shown by reference number 305, in some aspects, carrier aggregation may be configured in an intra-band contiguous mode where the aggregated carriers are contiguous to one another and are in the same band. As shown by reference number 310, in some aspects, carrier aggregation may be configured in an intra-band non-contiguous mode where the aggregated carriers are non-contiguous to one another and are in the same band. As shown by reference number 315, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some aspects, multiple carriers may be included in a PUCCH group. A PUCCH group is a group of carriers including a primary cell and one or more secondary cells. For a UE not using PUCCH switching, a PUCCH can only be transmitted on a primary cell of the PUCCH group. Some UEs may use PUCCH switching, in which a PUCCH can be transmitted on any of multiple different carriers. The techniques described herein provide for indication, such as via RRC or MAC signaling, of which CC should carry triggered HARQ feedback and/or one or more CCs to which the HARQ feedback should relate.

As indicated above, FIG. 3 is provided as an example. Other examples may differ from what is described with regard to FIG. 3.

Figure 4:
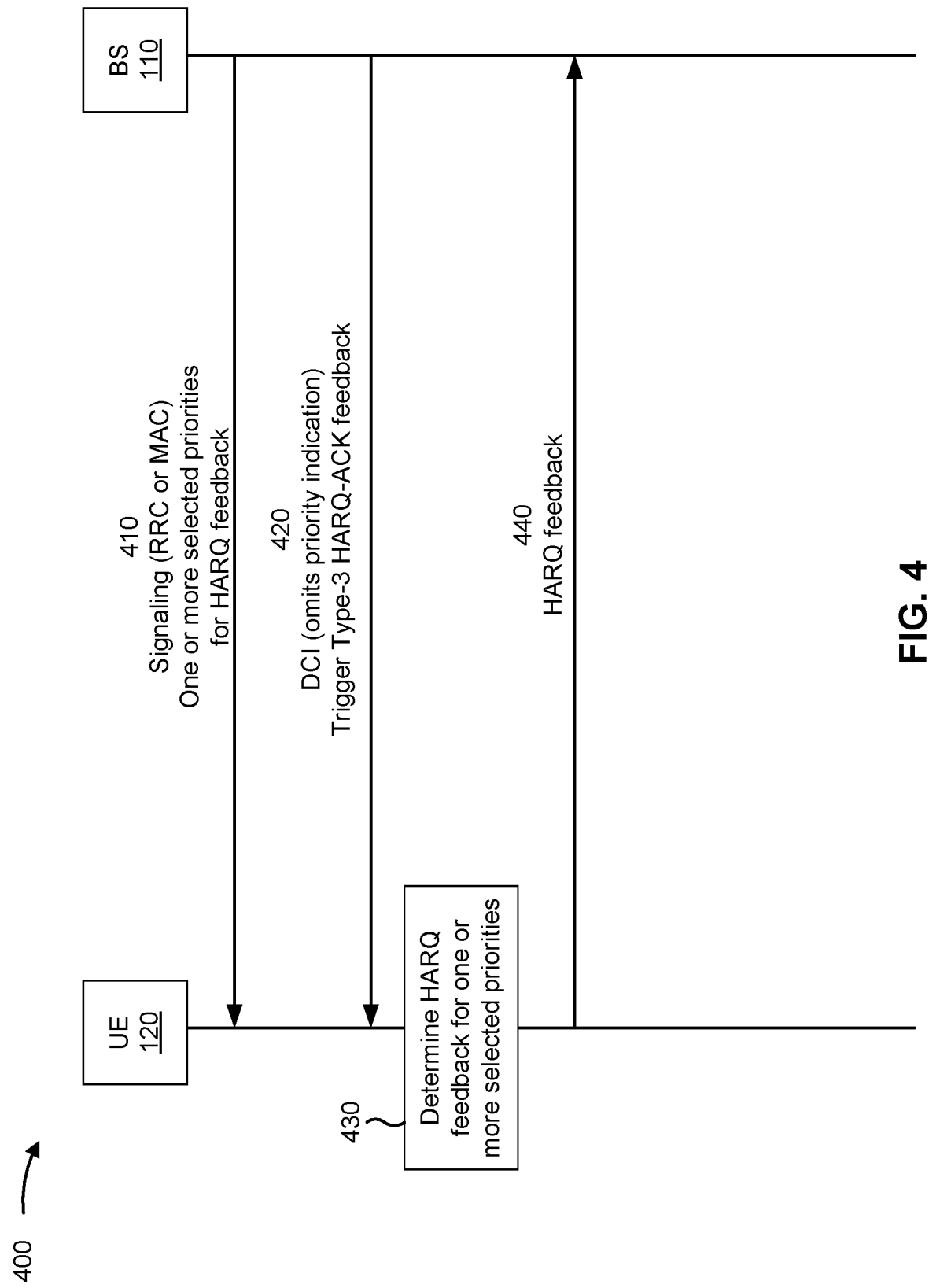
FIG. 4 is a diagram illustrating an example of signaling associated with a configuration for triggered hybrid automatic repeat request (HARD) feedback, in accordance with the present disclosure.

FIG. 4 is a diagram illustrating an example 400 of signaling associated with a configuration for triggered HARQ feedback, in accordance with the present disclosure. As shown, example 400 includes a UE 120 and a BS 110.

As shown in FIG. 4, and by reference number 410, the BS 110 may transmit, and the UE 120 may receive, signaling indicating one or more selected priorities to which a trigger for HARQ feedback applies. If the trigger for HARQ feedback applies to a particular priority, then the UE 120 may generate HARQ feedback regarding one or more HARQ processes of one or more communications associated with the particular priority. In some aspects, the signaling may be RRC signaling, MAC signaling, or a combination thereof. The HARQ feedback may be Type-3 HARQ-ACK feedback, such as one-shot HARQ-ACK feedback which can be triggered by a field in DCI. The one or more selected priorities may be selected from a plurality of priorities. In some aspects, the plurality of priorities may include a first priority (e.g., a higher priority) and a second priority (e.g., a lower priority).

In some aspects, the signaling may indicate a single selected priority. For example, the BS 110 may indicate that the trigger should trigger HARQ feedback for only HARQ processes associated with the single selected priority. In this case, the UE 120 may transmit a single HARQ codebook for the single selected priority. In some other aspects, the signaling may indicate a plurality of selected priorities. For example, the BS 110 may indicate that the trigger should trigger HARQ feedback for HARQ processes associated with each of the plurality of selected priorities. In this case, the UE 120 may transmit a respective HARQ codebook for each selected priority of the plurality of selected priorities. Additionally, or alternatively, the UE 120 may generate a combined HARQ codebook that provides HARQ feedback for each selected priority of the plurality of selected priorities.

As shown by reference number 420, the UE 120 may receive DCI triggering the HARQ feedback. For example, the DCI may include a field indicating that Type-3 HARQ-ACK feedback is triggered. In some aspects, the DCI may have a format associated with scheduling a PDSCH, such as DCI Format 1_1. In some aspects, the DCI may schedule a PDSCH. In a case where the HARQ feedback relates to multiple CCs, the DCI may schedule a PDSCH on each of the multiple CCs (e.g., a different PDSCH on each CC of the multiple CCs). In some other aspects, the DCI may not schedule a PDSCH. In some aspects, the DCI may not include a field indicating a priority for which HARQ feedback is triggered. For example, the UE 120 may determine the priority for which HARQ feedback is triggered in accordance with the signaling shown by reference number 410. In some aspects, the DCI may indicate resources (e.g., PUCCH resources or PUSCH resources) on which to transmit the HARQ feedback. For example, the DCI may indicate a first set of resources for a first priority and a second set of resources for a second priority. As another example, the DCI may indicate a set of resources for both the first priority and the second priority. In some aspects, the DCI may be a single DCI message. For example, the BS 110 can trigger transmission of HARQ feedback for multiple priorities using a single DCI message, which reduces overhead (e.g., PUCCH monitoring overhead) relative to transmitting or monitoring for a respective DCI message for each of the multiple priorities.

In some aspects, the DCI may indicate a carrier on which to transmit the HARQ feedback. For example, the DCI may include a field that specifies a carrier on which to transmit the HARQ feedback. In some aspects, the DCI may indicate a first carrier for HARQ feedback associated with a first priority and a second carrier for HARQ feedback associated with a second priority. In some aspects, the DCI may indicate a slot of a carrier on which to transmit the HARQ feedback. For example, the DCI may include a field that specifies the slot. In some aspects, the DCI may indicate which repetition of the PUCCH is to carry the HARQ feedback. For example, a PUCCH can be transmitted using PUCCH repetition, which improves likelihood of successful reception of the PUCCH. The DCI may indicate one or more repetitions of a PUCCH (e.g., a number of repetitions, specific repetitions, or the like) to carry the HARQ feedback. In some aspects, one or more of the above indications (e.g., a carrier on which to transmit the HARQ feedback, a slot of a carrier on which to transmit the HARQ feedback, one or more repetitions of a PUCCH to carry the HARQ feedback, or a combination thereof) may be carried by the signaling shown by reference number 410, or by signaling (e.g., RRC, MAC signaling, or DCI) other than the signaling shown by reference number 410 or the DCI shown by reference number 420.

In some aspects, the DCI may indicate a number of bits for the HARQ feedback (e.g., a number of bits included in the HARQ codebook). For example, the DCI may indicate a number of bits for HARQ feedback of each priority triggered by the DCI. In some aspects, a first priority may be associated with a different number of bits than a second priority. For example, a first priority may be associated with 4 bits and a second priority may be associated with 8 bits. In some aspects, the signaling shown by reference number 410 (or other signaling) may indicate the number of bits for the HARQ feedback.

In some aspects, the DCI may trigger HARQ feedback for one or more particular communications. For example, the DCI may indicate to transmit HARQ feedback that was previously cancelled. As another example, the DCI may indicate to transmit a cancelled HARQ-ACK for one or more particular SPS configurations. As yet another example, the DCI may indicate to transmit a cancelled HARQ-ACK for one or more HARQ processes. For example, the UE 120 may receive signaling (e.g., the signaling shown by reference number 410 or other signaling such as RRC signaling or MAC signaling) indicating a mapping between a value in the DCI (e.g., a codepoint, which may be included in a cancelled HARQ feedback field) and one or more SPS configurations. The one or more SPS configurations may be identified based at least in part on a quality of service (QoS) identifier, a 5G NR standardized QoS identifier (5GQI), a MAC layer priority indication, or a combination thereof.

In some aspects, the DCI may trigger HARQ feedback regarding multiple carriers. For example, the DCI may trigger HARQ feedback across multiple carriers regarding deferred or cancelled HARQ-ACK feedback for an SPS configuration or a dynamic grant. That is, the DCI may trigger transmission of HARQ feedback regarding accumulated (e.g., non-transmitted) HARQ feedback on multiple carriers. In this case, the UE 120 may transmit one HARQ codebook per carrier-priority combination. For example, the UE 120 may transmit a first HARQ codebook for a first carrier and a first priority, a second HARQ codebook for a second carrier and a second priority, a third HARQ codebook for the first carrier and the second priority, and a fourth HARQ codebook for the second carrier and the second priority. In some aspects, the DCI may schedule a PDSCH on each of the multiple carriers.

As shown by reference number 430, the UE 120 determine the HARQ feedback. For example, the UE 120 may determine one or more HARQ codebooks (e.g., one per carrier-priority combination). As shown by reference number 440, the UE 120 may transmit the HARQ feedback. For example, the UE 120 may transmit one or more HARQ codebooks in accordance with the signaling and/or the DCI. In some aspects, the UE 120 may transmit the one or more HARQ codebooks on one or more carriers indicated by the signaling shown by reference number 410 and/or the DCI shown by reference number 420. In some other aspects, the UE 120 may transmit the HARQ feedback on a carrier on which the DCI is received. In some other aspects, the UE 120 may transmit the HARQ feedback on a carrier associated with a communication to which the HARQ feedback relates. For example, if the HARQ feedback includes a HARQ codebook pertaining to communications on a given carrier, the HARQ feedback may be transmitted on the given carrier. In this case, the UE 120 may transmit each HARQ codebook on an earliest available slot of the corresponding carrier. In some other aspects, the UE 120 may transmit the HARQ feedback based at least in part on the one or more selected priorities. For example, the UE 120 may transmit a highest-priority HARQ codebook (e.g., HARQ feedback for communications of a highest priority) on an earliest available uplink slot of one or more component carriers, and the UE 120 may transmit a lower-priority HARQ codebook on a later slot of the one or more CCs. The BS 110 may receive the HARQ feedback. In some aspects, the BS 110 may perform a retransmission of one or more communications based at least in part on the HARQ feedback (not shown).

In this way, DCI signaling overhead is reduced relative to indicating the one or more selected priorities via DCI. Furthermore, it is simpler for the network (e.g., the BS 110) to manage load distribution since a CC on which the HARQ feedback will be received can be determined and configured ahead of receiving the HARQ feedback.

As indicated above, FIG. 4 is provided as an example. Other examples may differ from what is described with regard to FIG. 4.

Figure 5:
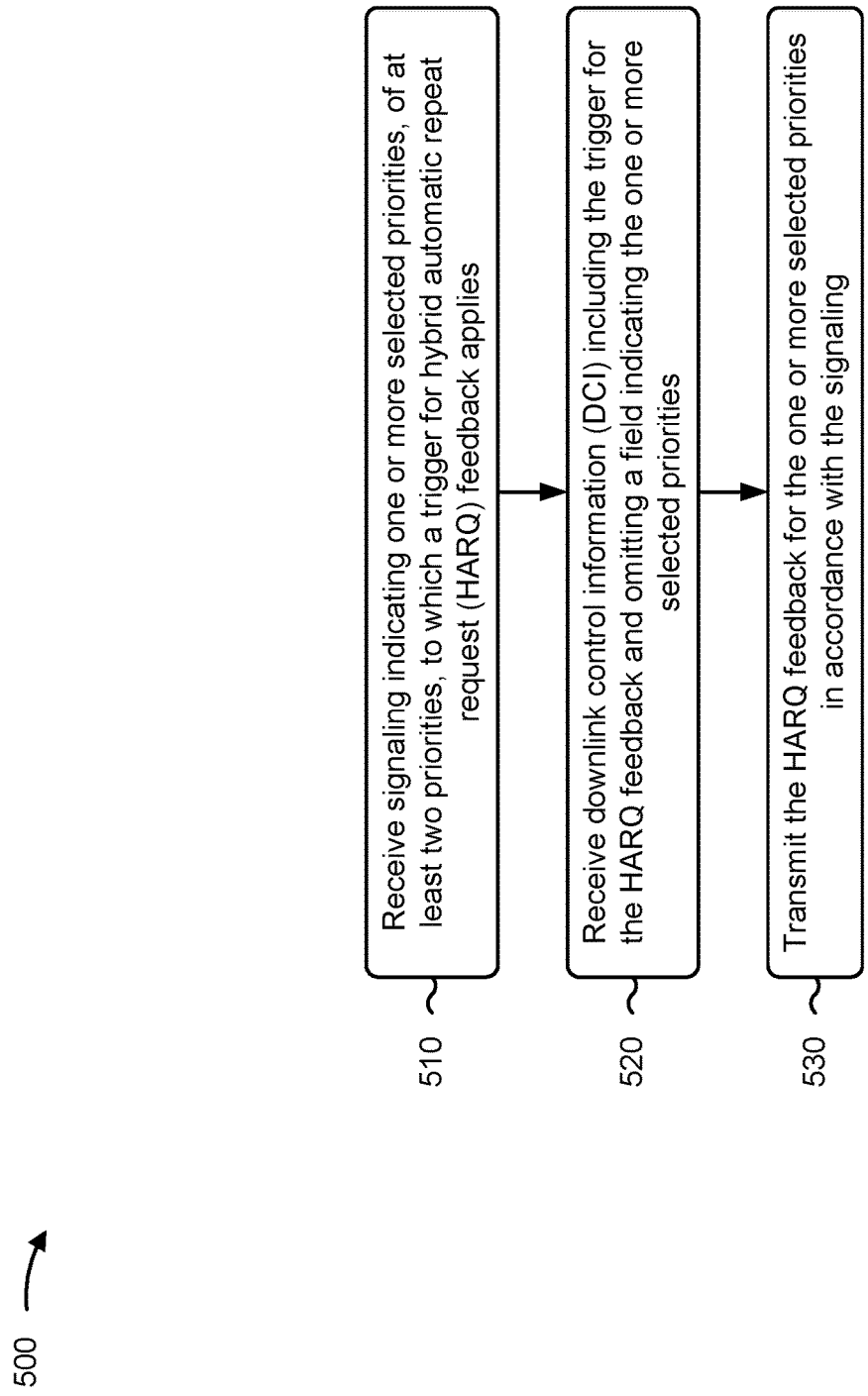
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120, an apparatus of UE 120) performs operations associated with a configuration-based hybrid automatic repeat request trigger.

As shown in FIG. 5, in some aspects, process 500 may include receiving signaling indicating one or more selected priorities, of at least two priorities, to which a trigger for HARQ feedback applies (block 510). For example, the UE (e.g., using communication manager 140 and/or reception component 702, depicted in FIG. 7) may receive signaling indicating one or more selected priorities, of at least two priorities, to which a trigger for HARQ feedback applies, as described above, for example, with reference to FIG. 4.

As further shown in FIG. 5, in some aspects, process 500 may include receiving DCI including the trigger for the HARQ feedback and omitting a field indicating the one or more selected priorities (block 520). For example, the UE (e.g., using communication manager 140 and/or reception component 702, depicted in FIG. 7) may receive DCI including the trigger for the HARQ feedback and omitting a field indicating the one or more selected priorities, as described above, for example, with reference to FIG. 4.

As further shown in FIG. 5, in some aspects, process 500 may include transmitting the HARQ feedback for the one or more selected priorities in accordance with the signaling (block 530). For example, the UE (e.g., using communication manager 140 and/or transmission component 704, depicted in FIG. 7) may transmit the HARQ feedback for the one or more selected priorities in accordance with the signaling, as described above, for example, with reference to FIG. 4.

Process 500 may include additional aspects, such as any single aspect or any combination of aspects described below and/or in connection with one or more other processes described elsewhere herein.

In a first aspect, the signaling includes at least one of radio resource control signaling or medium access control signaling.

In a second aspect, alone or in combination with the first aspect, the DCI is received in a single DCI message.

In a third aspect, alone or in combination with one or more of the first and second aspects, the DCI or the signaling includes an indication of a component carrier on which to transmit the HARQ feedback, and wherein transmitting the HARQ feedback further comprises transmitting the HARQ feedback in accordance with the indication.

In a fourth aspect, alone or in combination with one or more of the first through third aspects, the DCI or the signaling includes an indication of a time resource in which to transmit the HARQ feedback, and wherein transmitting the HARQ feedback further comprises transmitting the HARQ feedback in accordance with the indication.

In a fifth aspect, alone or in combination with one or more of the first through fourth aspects, the signaling indicates that the trigger applies to a first priority and a second priority, and wherein transmitting the HARQ feedback further comprises transmitting a first HARQ codebook and a second HARQ codebook, wherein the first HARQ codebook includes feedback associated with the first priority and the second HARQ codebook includes feedback associated with the second priority.

In a sixth aspect, alone or in combination with one or more of the first through fifth aspects, the DCI or the signaling indicates at least one time resource for transmitting at least one of the first HARQ codebook or the second HARQ codebook.

In a seventh aspect, alone or in combination with one or more of the first through sixth aspects, the DCI or the signaling indicates a rule for transmitting the second HARQ codebook based at least in part on when the first HARQ codebook was transmitted.

In an eighth aspect, alone or in combination with one or more of the first through seventh aspects, the first HARQ codebook and the second HARQ codebook are transmitted concurrently.

In a ninth aspect, alone or in combination with one or more of the first through eighth aspects, the DCI or the signaling indicates a component carrier for which the HARQ feedback is to be transmitted.

In a tenth aspect, alone or in combination with one or more of the first through ninth aspects, the DCI or the signaling indicates a number of bits in a HARQ codebook of the HARQ feedback.

In an eleventh aspect, alone or in combination with one or more of the first through tenth aspects, the number of bits is associated with the one or more selected priorities, and wherein different priorities are associated with different numbers of bits.

In a twelfth aspect, alone or in combination with one or more of the first through eleventh aspects, the DCI indicates a particular semi-persistent scheduling configuration for which the HARQ feedback is to be provided.

In a thirteenth aspect, alone or in combination with one or more of the first through twelfth aspects, the DCI indicates a set of HARQ identifiers for which the HARQ feedback is to be provided.

In a fourteenth aspect, alone or in combination with one or more of the first through thirteenth aspects, the HARQ feedback is deferred or cancelled HARQ feedback across multiple component carriers.

In a fifteenth aspect, alone or in combination with one or more of the first through fourteenth aspects, the signaling indicates the multiple component carriers.

In a sixteenth aspect, alone or in combination with one or more of the first through fifteenth aspects, the HARQ feedback is transmitted on a component carrier on which the DCI was received.

In a seventeenth aspect, alone or in combination with one or more of the first through sixteenth aspects, the HARQ feedback, for a component carrier of the multiple component carriers, is transmitted in an earliest available slot on the component carrier.

In an eighteenth aspect, alone or in combination with one or more of the first through seventeenth aspects, the HARQ feedback includes a HARQ codebook associated with a highest priority, and wherein the HARQ codebook associated with the highest priority is transmitted on an earliest available slot of an available component carrier.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
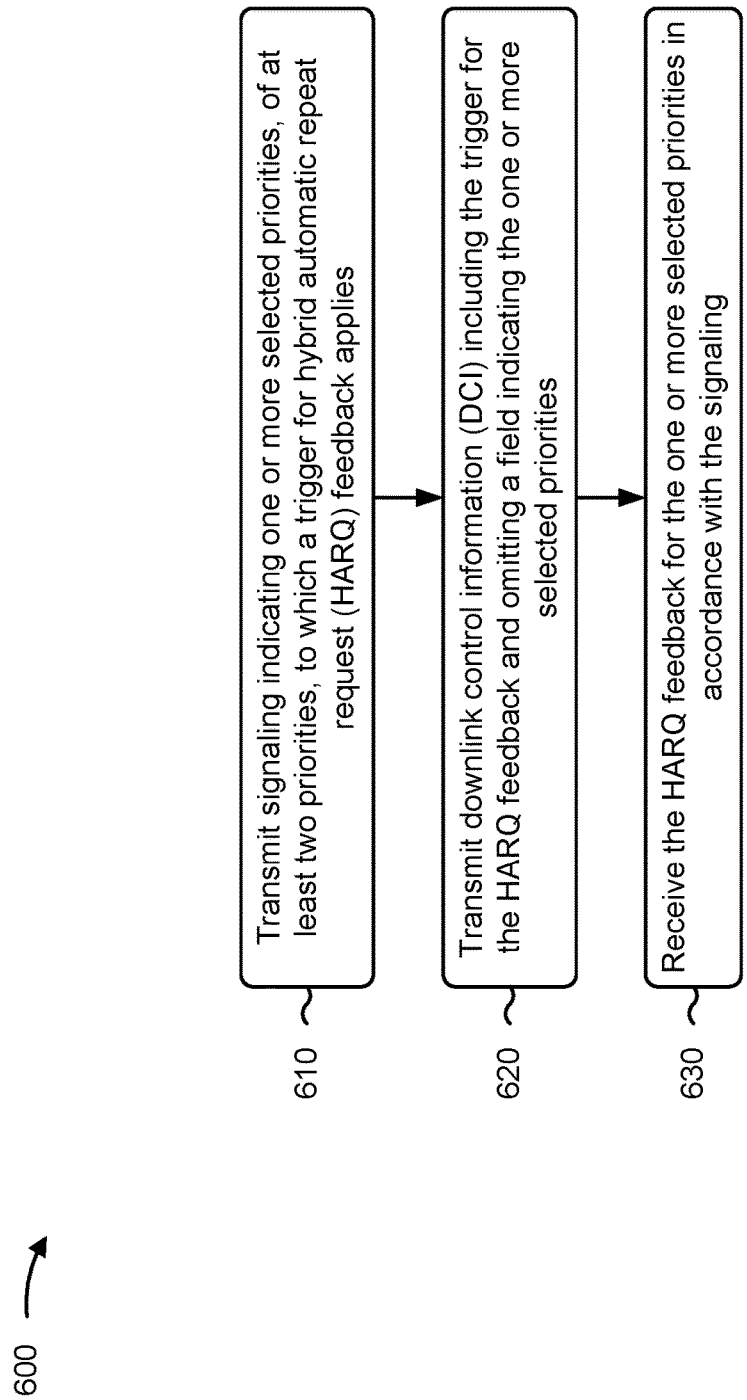
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110, an apparatus of base station 110) performs operations associated with a configuration based hybrid automatic repeat request trigger. In some aspects, the operations of example 600 may be performed by a network node of a base station, such as a CU, a DU, an RU, or a combination thereof, of a disaggregated base station.

As shown in FIG. 6, in some aspects, process 600 may include transmitting signaling indicating one or more selected priorities, of at least two priorities, to which a trigger for HARQ feedback applies (block 610). For example, the base station (e.g., using communication manager 150 and/or transmission component 804, depicted in FIG. 8) may transmit signaling indicating one or more selected priorities, of at least two priorities, to which a trigger for HARQ feedback applies, as described above, for example, with reference to FIG. 4.

As further shown in FIG. 6, in some aspects, process 600 may include transmitting DCI including the trigger for the HARQ feedback and omitting a field indicating the one or more selected priorities (block 620). For example, the base station (e.g., using communication manager 150 and/or transmission component 804, depicted in FIG. 8) may transmit DCI including the trigger for the HARQ feedback and omitting a field indicating the one or more selected priorities, as described above, for example, with reference to FIG. 4.

As further shown in FIG. 6, in some aspects, process 600 may include receiving the HARQ feedback for the one or more selected priorities in accordance with the signaling (block 630). For example, the base station (e.g., using communication manager 150 and/or reception component 802, depicted in FIG. 8) may receive the HARQ feedback for the one or more selected priorities in accordance with the signaling, as described above, for example, with reference to FIG. 4.

Process 600 may include additional aspects, such as any single aspect or any combination of aspects described below and/or in connection with one or more other processes described elsewhere herein.

In a first aspect, the signaling includes at least one of radio resource control signaling or medium access control signaling.

In a second aspect, alone or in combination with the first aspect, the DCI is transmitted in a single DCI message.

In a third aspect, alone or in combination with one or more of the first and second aspects, the DCI or the signaling includes an indication of a component carrier on which to transmit the HARQ feedback, and wherein receiving the HARQ feedback further comprises receiving the HARQ feedback in accordance with the indication.

In a fourth aspect, alone or in combination with one or more of the first through third aspects, the DCI or the signaling includes an indication of a time resource in which to transmit the HARQ feedback, and wherein receiving the HARQ feedback further comprises receiving the HARQ feedback in accordance with the indication.

In a fifth aspect, alone or in combination with one or more of the first through fourth aspects, the signaling indicates that the trigger applies to a first priority and a second priority, and wherein receiving the HARQ feedback further comprises receiving a first HARQ codebook and a second HARQ codebook, wherein the first HARQ codebook includes feedback associated with the first priority and the second HARQ codebook includes feedback associated with the second priority.

In a sixth aspect, alone or in combination with one or more of the first through fifth aspects, the DCI or the signaling indicates at least one time resource for transmitting at least one of the first HARQ codebook or the second HARQ codebook.

In a seventh aspect, alone or in combination with one or more of the first through sixth aspects, the DCI or the signaling indicates a rule for transmitting the second HARQ codebook based at least in part on when the first HARQ codebook was transmitted.

In an eighth aspect, alone or in combination with one or more of the first through seventh aspects, the first HARQ codebook and the second HARQ codebook are received concurrently.

In a ninth aspect, alone or in combination with one or more of the first through eighth aspects, the DCI or the signaling indicates a component carrier for which the HARQ feedback is to be transmitted.

In a tenth aspect, alone or in combination with one or more of the first through ninth aspects, the DCI or the signaling indicates a number of bits in a HARQ codebook of the HARQ feedback.

In an eleventh aspect, alone or in combination with one or more of the first through tenth aspects, the number of bits is associated with the one or more selected priorities, and wherein different priorities are associated with different numbers of bits.

In a twelfth aspect, alone or in combination with one or more of the first through eleventh aspects, the DCI indicates a particular semi-persistent scheduling configuration for which the HARQ feedback is to be provided.

In a thirteenth aspect, alone or in combination with one or more of the first through twelfth aspects, the DCI indicates a set of HARQ identifiers for which the HARQ feedback is to be provided.

In a fourteenth aspect, alone or in combination with one or more of the first through thirteenth aspects, the HARQ feedback is deferred or cancelled HARQ feedback across multiple component carriers.

In a fifteenth aspect, alone or in combination with one or more of the first through fourteenth aspects, the signaling indicates the multiple component carriers.

In a sixteenth aspect, alone or in combination with one or more of the first through fifteenth aspects, the HARQ feedback is received on a component carrier on which the DCI was received.

In a seventeenth aspect, alone or in combination with one or more of the first through sixteenth aspects, the HARQ feedback, for a component carrier of the multiple component carriers, is received in an earliest available slot on the component carrier.

In an eighteenth aspect, alone or in combination with one or more of the first through seventeenth aspects, the HARQ feedback includes a HARQ codebook associated with a highest priority, and wherein the HARQ codebook associated with the highest priority is transmitted on an earliest available slot of an available component carrier.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
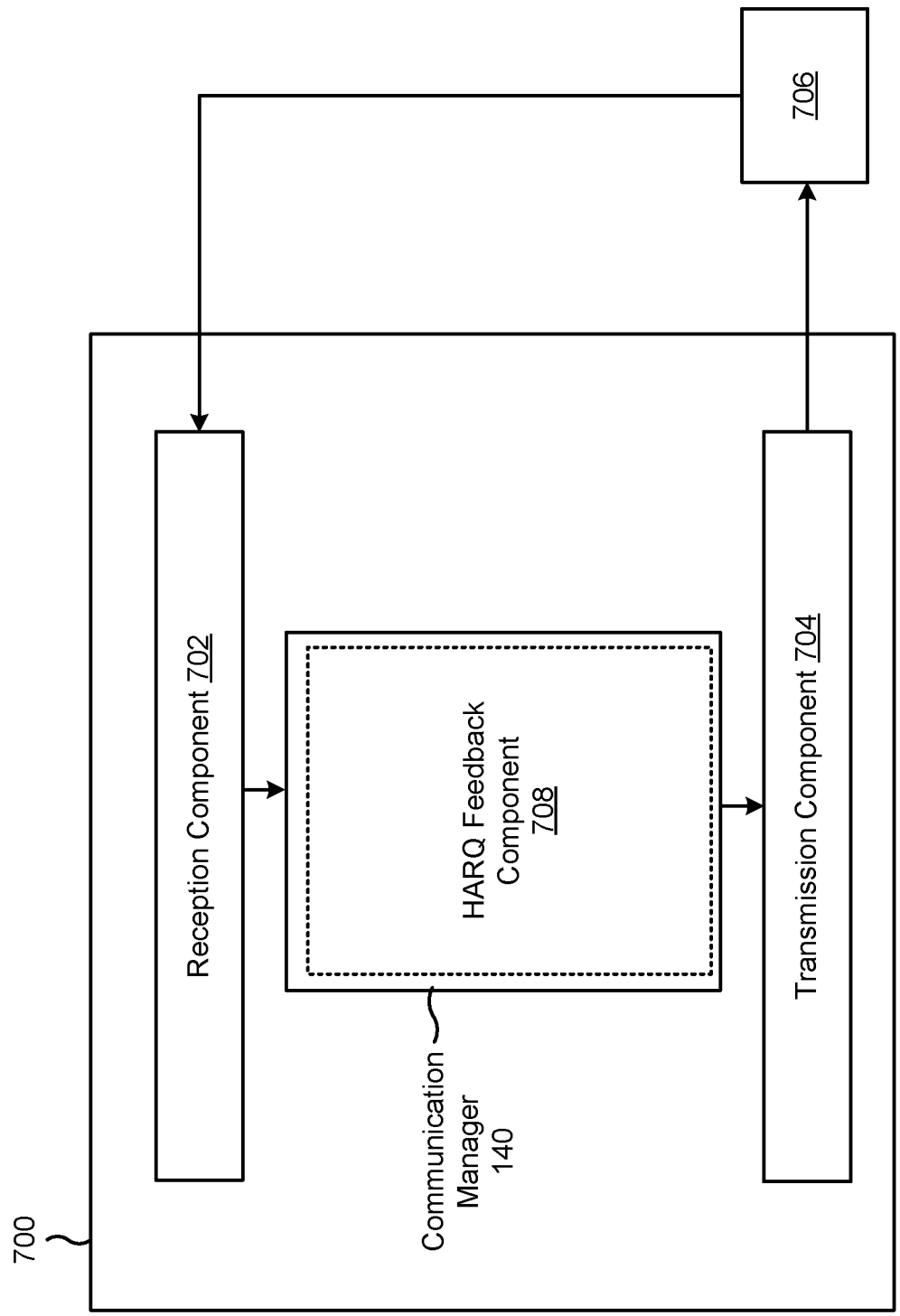
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a HARQ feedback component 708, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive signaling indicating one or more selected priorities, of at least two priorities, to which a trigger for HARQ feedback applies. The reception component 702 may receive DCI including the trigger for the HARQ feedback and omitting a field indicating the one or more selected priorities. The transmission component 704 or the HARQ feedback component 708 may transmit the HARQ feedback for the one or more selected priorities in accordance with the signaling.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
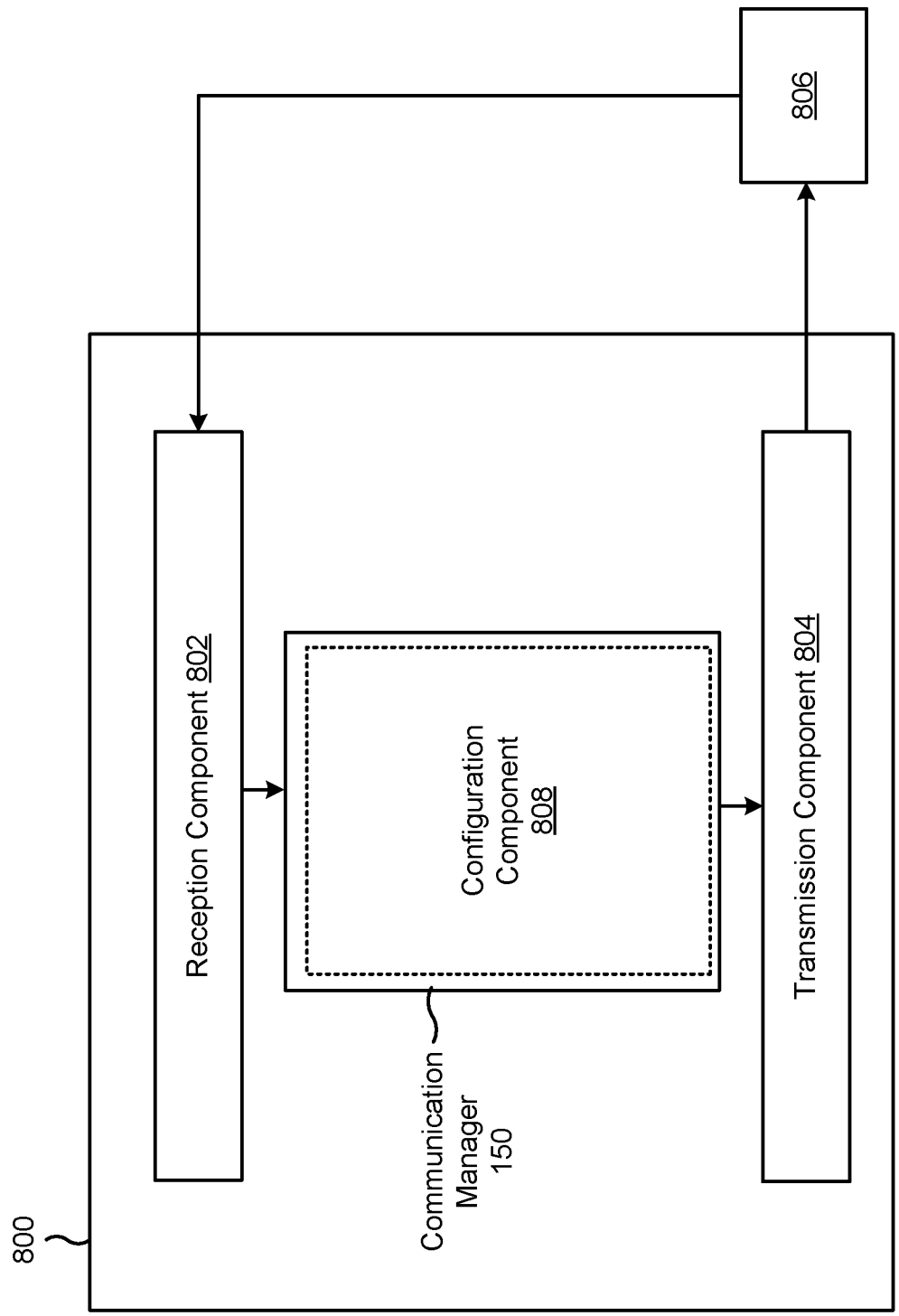
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a configuration component 808, among other examples.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 or the configuration component 808 may transmit signaling indicating one or more selected priorities, of at least two priorities, to which a trigger for HARQ feedback applies. The transmission component 804 may transmit DCI including the trigger for the HARQ feedback and omitting a field indicating the one or more selected priorities. The reception component 802 may receive the HARQ feedback for the one or more selected priorities in accordance with the signaling.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving signaling indicating one or more selected priorities, of at least two priorities, to which a trigger for hybrid automatic repeat request (HARQ) feedback applies; receiving downlink control information (DCI) including the trigger for the HARQ feedback and omitting a field indicating the one or more selected priorities; and transmitting the HARQ feedback for the one or more selected priorities in accordance with the signaling.

Aspect 2: The method of Aspect 1, wherein the signaling includes at least one of radio resource control signaling or medium access control signaling.

Aspect 3: The method of any of Aspects 1-2, wherein the DCI is received in a single DCI message.

Aspect 4: The method of any of Aspects 1-3, wherein the DCI or the signaling includes an indication of a component carrier on which to transmit the HARQ feedback, and wherein transmitting the HARQ feedback further comprises: transmitting the HARQ feedback in accordance with the indication.

Aspect 5: The method of any of Aspects 1-4, wherein the DCI or the signaling includes an indication of a time resource in which to transmit the HARQ feedback, and wherein transmitting the HARQ feedback further comprises: transmitting the HARQ feedback in accordance with the indication.

Aspect 6: The method of any of Aspects 1-5, wherein the signaling indicates that the trigger applies to a first priority and a second priority, and wherein transmitting the HARQ feedback further comprises: transmitting a first HARQ codebook and a second HARQ codebook, wherein the first HARQ codebook includes feedback associated with the first priority and the second HARQ codebook includes feedback associated with the second priority.

Aspect 7: The method of Aspect 6, wherein the DCI or the signaling indicates at least one time resource for transmitting at least one of the first HARQ codebook or the second HARQ codebook.

Aspect 8: The method of Aspect 6, wherein the DCI or the signaling indicates a rule for transmitting the second HARQ codebook based at least in part on when the first HARQ codebook was transmitted.

Aspect 9: The method of Aspect 6, wherein the first HARQ codebook and the second HARQ codebook are transmitted concurrently.

Aspect 10: The method of any of Aspects 1-9, wherein the DCI or the signaling indicates a component carrier for which the HARQ feedback is to be transmitted.

Aspect 11: The method of any of Aspects 1-10, wherein the DCI or the signaling indicates a number of bits in a HARQ codebook of the HARQ feedback.

Aspect 12: The method of Aspect 11, wherein the number of bits is associated with the one or more selected priorities, and wherein different priorities are associated with different numbers of bits.

Aspect 13: The method of any of Aspects 1-12, wherein the DCI indicates a particular semi-persistent scheduling configuration for which the HARQ feedback is to be provided.

Aspect 14: The method any of Aspects 1-13, wherein the DCI indicates a set of HARQ identifiers for which the HARQ feedback is to be provided.

Aspect 15: The method of any of Aspects 1-14, wherein the HARQ feedback is deferred or cancelled HARQ feedback across multiple component carriers.

Aspect 16: The method of Aspect 15, wherein the signaling indicates the multiple component carriers.

Aspect 17: The method of Aspect 15, wherein the HARQ feedback is transmitted on a component carrier on which the DCI was received.

Aspect 18: The method of Aspect 15, wherein the HARQ feedback, for a component carrier of the multiple component carriers, is transmitted in an earliest available slot on the component carrier.

Aspect 19: The method of Aspect 15, wherein the HARQ feedback includes a HARQ codebook associated with a highest priority, and wherein the HARQ codebook associated with the highest priority is transmitted on an earliest available slot of an available component carrier.

Aspect 20: A method of wireless communication performed by a base station, comprising: transmitting signaling indicating one or more selected priorities, of at least two priorities, to which a trigger for hybrid automatic repeat request (HARQ) feedback applies; transmitting downlink control information (DCI) including the trigger for the HARQ feedback and omitting a field indicating the one or more selected priorities; and receiving the HARQ feedback for the one or more selected priorities in accordance with the signaling.

Aspect 21: The method of Aspect 20, wherein the signaling includes at least one of radio resource control signaling or medium access control signaling.

Aspect 22: The method of any of Aspects 20-21, wherein the DCI is transmitted in a single DCI message.

Aspect 23: The method of any of Aspects 20-22, wherein the DCI or the signaling includes an indication of a component carrier on which to transmit the HARQ feedback, and wherein receiving the HARQ feedback further comprises: receiving the HARQ feedback in accordance with the indication.

Aspect 24: The method of any of Aspects 20-23, wherein the DCI or the signaling includes an indication of a time resource in which to transmit the HARQ feedback, and wherein receiving the HARQ feedback further comprises: receiving the HARQ feedback in accordance with the indication.

Aspect 25: The method of any of Aspects 20-24, wherein the signaling indicates that the trigger applies to a first priority and a second priority, and wherein receiving the HARQ feedback further comprises: receiving a first HARQ codebook and a second HARQ codebook, wherein the first HARQ codebook includes feedback associated with the first priority and the second HARQ codebook includes feedback associated with the second priority.

Aspect 26: The method of Aspect 25, wherein the DCI or the signaling indicates at least one time resource for transmitting at least one of the first HARQ codebook or the second HARQ codebook.

Aspect 27: The method of Aspect 25, wherein the DCI or the signaling indicates a rule for transmitting the second HARQ codebook based at least in part on when the first HARQ codebook was transmitted.

Aspect 28: The method of Aspect 25, wherein the first HARQ codebook and the second HARQ codebook are received concurrently.

Aspect 29: The method of any of Aspects 20-28, wherein the DCI or the signaling indicates a component carrier for which the HARQ feedback is to be transmitted.

Aspect 30: The method of any of Aspects 20-29, wherein the DCI or the signaling indicates a number of bits in a HARQ codebook of the HARQ feedback.

Aspect 31: The method of Aspect 30, wherein the number of bits is associated with the one or more selected priorities, and wherein different priorities are associated with different numbers of bits.

Aspect 32: The method of any of Aspects 20-23, wherein the DCI indicates a particular semi-persistent scheduling configuration for which the HARQ feedback is to be provided.

Aspect 33: The method of any of Aspects 20-32, wherein the DCI indicates a set of HARQ identifiers for which the HARQ feedback is to be provided.

Aspect 34: The method of any of Aspects 20-33, wherein the HARQ feedback is deferred or cancelled HARQ feedback across multiple component carriers.

Aspect 35: The method of Aspect 34, wherein the signaling indicates the multiple component carriers.

Aspect 36: The method of Aspect 34, wherein the HARQ feedback is received on a component carrier on which the DCI was received.

Aspect 37: The method of Aspect 34, wherein the HARQ feedback, for a component carrier of the multiple component carriers, is received in an earliest available slot on the component carrier.

Aspect 38: The method of Aspect 34, wherein the HARQ feedback includes a HARQ codebook associated with a highest priority, and wherein the HARQ codebook associated with the highest priority is transmitted on an earliest available slot of an available component carrier.

Aspect 39: A method of wireless communication performed by a UE, comprising receiving signaling indicating one or more selected priorities, of at least two priorities, to which a trigger for hybrid automatic repeat request (HARQ) feedback applies; receiving downlink control information (DCI) including the trigger for the HARQ feedback and omitting a field indicating the one or more selected priorities; and transmitting the HARQ feedback for the one or more selected priorities in accordance with the signaling.

Aspect 40: The method of Aspect 39, wherein the DCI triggers HARQ feedback regarding multiple component carriers.

Aspect 41: The method of any of Aspects 39-40, wherein the signaling indicates the multiple component carriers.

Aspect 42: The method of Aspect 41, wherein the one or more processors, to transmit the HARQ feedback, are further configured to transmit the HARQ feedback on a component carrier on which the DCI was received.

Aspect 43: The method of Aspect 41, wherein the HARQ feedback, for a component carrier of the multiple component carriers, is in an earliest available slot on the component carrier.

Aspect 44: The method of Aspect 41, wherein the HARQ feedback includes a HARQ codebook associated with a highest priority, and wherein the HARQ codebook associated with the highest priority is in an earliest available slot of an available component carrier.

Aspect 45: The method of Aspect 44, wherein the one or more processors, to transmit the HARQ feedback, are configured to transmit, on a given carrier of the multiple component carriers, a HARQ codebook pertaining to communications on the given carrier.

Aspect 46: The method of Aspect 45, wherein transmitting the HARQ feedback further comprises transmitting multiple HARQ codebooks on the multiple component carriers.

Aspect 47: The method of any of Aspects 39-46, wherein the signaling includes at least one of radio resource control signaling or medium access control signaling.

Aspect 48: The method of any of Aspects 39-47, wherein the DCI is a single DCI message.

Aspect 49: The method of any of Aspects 39-48, wherein the DCI or the signaling includes an indication of a component carrier on which to transmit the HARQ feedback, and wherein transmitting the HARQ feedback further comprises transmitting the HARQ feedback in accordance with the indication.

Aspect 50: The method of any of Aspects 39-49, wherein the DCI or the signaling includes an indication of a time resource in which to transmit the HARQ feedback, and transmitting the HARQ feedback further comprises transmitting the HARQ feedback in accordance with the indication.

Aspect 51: The method of any of Aspects 39-50, wherein the signaling indicates that the trigger applies to a first priority and a second priority, and wherein transmitting the HARQ feedback further comprises transmitting a first HARQ codebook and a second HARQ codebook, wherein the first HARQ codebook includes feedback associated with the first priority and the second HARQ codebook includes feedback associated with the second priority.

Aspect 52: The method of Aspect 51, wherein the DCI or the signaling indicates at least one time resource for transmitting at least one of the first HARQ codebook or the second HARQ codebook.

Aspect 53: The method of Aspect 51, wherein the DCI or the signaling indicates a rule for transmitting the second HARQ codebook based at least in part on when the first HARQ codebook was transmitted.

Aspect 54: The method of Aspect 51, wherein the first HARQ codebook and the second HARQ codebook are transmitted concurrently.

Aspect 55: The method of any of Aspects 39-54, wherein the DCI or the signaling indicates a component carrier for which the HARQ feedback is to be transmitted.

Aspect 56: The method of any of Aspects 39-55, wherein the DCI or the signaling indicates a number of bits in a HARQ codebook of the HARQ feedback.

Aspect 57: The method of any of Aspects 39-56, wherein the DCI indicates a particular semi-persistent scheduling configuration for which the HARQ feedback is to be provided.

Aspect 58: A base station for wireless communication, comprising a memory; and one or more processors, coupled to the memory, configured to: transmit downlink control information (DCI) including a trigger for hybrid automatic repeat request (HARQ) feedback and omitting a field indicating one or more selected priorities, of at least two priorities, to which the trigger for hybrid automatic repeat request (HARQ) feedback applies, wherein signaling separate from the DCI indicates the one or more selected priorities; and receive the HARQ feedback for the one or more selected priorities in accordance with the signaling.

Aspect 59: The base station of Aspect 58, wherein the signaling includes at least one of radio resource control signaling or medium access control signaling.

Aspect 60: The base station of any of Aspects 58-59, wherein the DCI is transmitted in a single DCI message.

Aspect 61: The base station of any of Aspects 58-60, wherein the DCI or the signaling includes an indication of a component carrier on which to transmit the HARQ feedback, and wherein receiving the HARQ feedback further comprises receiving the HARQ feedback in accordance with the indication.

Aspect 62: The base station of any of Aspects 58-61, wherein the DCI triggers HARQ feedback regarding multiple component carriers.

Aspect 63: The base station of Aspect 62, wherein the signaling indicates the multiple component carriers.

Aspect 64: The base station of Aspect 62, wherein transmitting the HARQ feedback further comprises transmitting the HARQ feedback on a component carrier on which the DCI was received.

Aspect 65: The base station of Aspect 62, wherein the HARQ feedback, for a component carrier of the multiple component carriers, is in an earliest available slot on the component carrier.

Aspect 66: The base station of Aspect 62, wherein the HARQ feedback includes a HARQ codebook associated with a highest priority, and wherein the HARQ codebook associated with the highest priority is in an earliest available slot of an available component carrier.

Aspect 67: An apparatus for wireless communication at a device, comprising a processor; memory coupled with the processor; and instructions stored in the memory and executable by the processor to cause the apparatus to perform the method of one or more of Aspects 1-66.

Aspect 68: A device for wireless communication, comprising a memory and one or more processors coupled to the memory, the one or more processors configured to perform the method of one or more of Aspects 1-66.

Aspect 69: An apparatus for wireless communication, comprising at least one means for performing the method of one or more of Aspects 1-66.

Aspect 70: A non-transitory computer-readable medium storing code for wireless communication, the code comprising instructions executable by a processor to perform the method of one or more of Aspects 1-66.

Aspect 71: A non-transitory computer-readable medium storing a set of instructions for wireless communication, the set of instructions comprising one or more instructions that, when executed by one or more processors of a device, cause the device to perform the method of one or more of Aspects 1-66.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive signaling indicating one or more selected priorities, of at least two priorities, to which a trigger for hybrid automatic repeat request (HARQ) feedback applies;
   receive downlink control information (DCI) including the trigger for the HARQ feedback, wherein the DCI does not include a field indicating the one or more selected priorities; and
   transmit the HARQ feedback for the one or more selected priorities in accordance with the signaling, wherein the DCI triggers the HARQ feedback.

2. The UE of claim 1, wherein the DCI triggers the HARQ feedback regarding multiple component carriers.

3. The UE of claim 2, wherein the signaling indicates the multiple component carriers.

4. The UE of claim 2, wherein the one or more processors, to transmit the HARQ feedback, are further configured to transmit the HARQ feedback on a component carrier on which the DCI was received.

5. The UE of claim 2, wherein the HARQ feedback, for a component carrier of the multiple component carriers, is in an earliest available slot on the component carrier.

6. The UE of claim 2, wherein the HARQ feedback includes a HARQ codebook associated with a highest priority, and wherein the HARQ codebook associated with the highest priority is in an earliest available slot of an available component carrier.

7. The UE of claim 2, wherein the one or more processors, to transmit the HARQ feedback, are configured to transmit, on a given carrier of the multiple component carriers, a HARQ codebook pertaining to communications on the given carrier.

8. The UE of claim 7, wherein transmitting the HARQ feedback further comprises transmitting multiple HARQ codebooks on the multiple component carriers.

9. The UE of claim 1, wherein the signaling includes at least one of radio resource control signaling or medium access control signaling.

10. The UE of claim 1, wherein the DCI is a single DCI message, and wherein the single DCI message includes a field indicating that Type-3 HARQ-ACK feedback is triggered.

11. The UE of claim 1, wherein the DCI or the signaling includes an indication of a component carrier on which to transmit the HARQ feedback, and
wherein the one or more processors, to transmit the HARQ feedback, are configured to:
transmit the HARQ feedback in accordance with the indication.

12. The UE of claim 1, wherein the DCI or the signaling includes an indication of a time resource in which to transmit the HARQ feedback, and
wherein the one or more processors, to transmit the HARQ feedback, are configured to:
transmit the HARQ feedback in accordance with the indication.

13. The UE of claim 1, wherein the signaling indicates that the trigger applies to a first priority and a second priority, and wherein transmitting the HARQ feedback further comprises:
transmit a first HARQ codebook and a second HARQ codebook, wherein the first HARQ codebook includes feedback associated with the first priority and the second HARQ codebook includes feedback associated with the second priority.

14. The UE of claim 13, wherein the DCI or the signaling indicates at least one time resource for transmitting at least one of the first HARQ codebook or the second HARQ codebook.

15. The UE of claim 13, wherein the DCI or the signaling indicates a rule for transmitting the second HARQ codebook based at least in part on when the first HARQ codebook was transmitted.

16. The UE of claim 13, wherein the first HARQ codebook and the second HARQ codebook are transmitted concurrently.

17. The UE of claim 1, wherein the DCI or the signaling indicates a component carrier for which the HARQ feedback is to be transmitted.

18. The UE of claim 1, wherein the DCI or the signaling indicates a number of bits in a HARQ codebook of the HARQ feedback.

19. The UE of claim 1, wherein the DCI indicates a particular semi-persistent scheduling configuration for which the HARQ feedback is to be provided.

20. A base station for wireless communication, comprising:
a memory; and
one or more processors, coupled to the memory, configured to:
transmit downlink control information (DCI) including a trigger for hybrid automatic repeat request (HARQ) feedback, wherein the DCI does not include a field indicating one or more selected priorities, of at least two priorities, to which the trigger for HARQ feedback applies, wherein signaling separate from the DCI indicates the one or more selected priorities; and
receive the HARQ feedback for the one or more selected priorities in accordance with the signaling, wherein the DCI triggers the HARQ feedback.

21. The base station of claim 20, wherein the signaling includes at least one of radio resource control signaling or medium access control signaling.

22. The base station of claim 20, wherein the DCI is transmitted in a single DCI message, and wherein the single DCI message includes a field indicating that Type-3 HARQ-ACK feedback is triggered.

23. The base station of claim 20, wherein the DCI or the signaling includes an indication of a component carrier on which to transmit the HARQ feedback, and
wherein the one or more processors, to receive the HARQ feedback, are configured to:
receive the HARQ feedback in accordance with the indication.

24. The base station of claim 20, wherein the DCI triggers the HARQ feedback regarding multiple component carriers.

25. The base station of claim 24, wherein the signaling indicates the multiple component carriers.

26. The base station of claim 24, wherein the one or more processors, to transmit the HARQ feedback, are further configured to transmit the HARQ feedback on a component carrier on which the DCI was received.

27. The base station of claim 24, wherein the HARQ feedback, for a component carrier of the multiple component carriers, is in an earliest available slot on the component carrier.

28. The base station of claim 24, wherein the HARQ feedback includes a HARQ codebook associated with a highest priority, and wherein the HARQ codebook associated with the highest priority is in an earliest available slot of an available component carrier.

29. A method of wireless communication performed by a user equipment (UE), comprising:
receiving signaling indicating one or more selected priorities, of at least two priorities, to which a trigger for hybrid automatic repeat request (HARQ) feedback applies;
receiving downlink control information (DCI) including the trigger for the HARQ feedback, and wherein the DCI does not include a field indicating the one or more selected priorities; and
transmitting the HARQ feedback for the one or more selected priorities in accordance with the signaling, wherein the DCI triggers the HARQ feedback.

30. A method of wireless communication performed by a base station, comprising:
transmitting downlink control information (DCI) including a trigger for hybrid automatic repeat request (HARQ) feedback, wherein the DCI does not include a field indicating one or more selected priorities, of at least two priorities, to which the trigger for HARQ feedback applies, wherein signaling separate from the DCI indicates the one or more selected priorities; and
receiving the HARQ feedback for the one or more selected priorities in accordance with the signaling, wherein the DCI triggers the HARQ feedback.

* * * * *